United States Patent
Laksin et al.

(10) Patent No.: US 7,997,194 B2
(45) Date of Patent: Aug. 16, 2011

(54) METHOD OF PRINTING AND DECORATING PACKAGING MATERIALS WITH ELECTRON BEAM CURABLE INKS

(75) Inventors: Mikhail Laksin, Boonton, NJ (US); Subhankar Chatterjee, Hampton, NJ (US)

(73) Assignee: Ideon LLC, Hillsborough, NJ (US)

( * ) Notice: Subject to any disclaimer, the term of this patent is extended or adjusted under 35 U.S.C. 154(b) by 702 days.

(21) Appl. No.: 12/135,438

(22) Filed: Jun. 9, 2008

(65) Prior Publication Data

US 2009/0301331 A1 Dec. 10, 2009

(51) Int. Cl.
*B41M 1/18* (2006.01)
(52) U.S. Cl. ..... 101/211; 101/491; 101/183; 101/424.1; 101/177; 101/181; 101/483
(58) Field of Classification Search ........................ None
See application file for complete search history.

(56) References Cited

U.S. PATENT DOCUMENTS 5,690,028 A 11/1997 Schick ........................... 101/211
6,772,683 B2 8/2004 Laksin et al. .................. 101/211

FOREIGN PATENT DOCUMENTS

DE 197 16 261 10/1998

*Primary Examiner* — Joshua D. Zimmerman
(74) *Attorney, Agent, or Firm* — Roberts & Roberts, LLP

(57) ABSTRACT

A method for printing and decorating packaging materials, such as paper, paper board and various flexible polymer films by electron beam exposure of plural layers of curable inks and coatings which do not substantially change viscosity during the printing process. The inks and coating are essentially free of volatile components such as organic solvents, inorganic solvents, water and low molecular weight fractions before, during and after exposure to electron beam irradiation. The method involves applying multiple layers of ink and an optional coating onto a substrate. The ink is an admixture of a colorant, and an unsaturated component such that the inks have a maximum of 10% volatile components. Thereafter these layers are simultaneously exposed with electron beam radiation to cause the ethylenically unsaturated components to polymerize or crosslink such that they become dried.

19 Claims, No Drawings

METHOD OF PRINTING AND DECORATING PACKAGING MATERIALS WITH ELECTRON BEAM CURABLE INKS

BACKGROUND OF THE INVENTION

1. Field of the Invention

The present invention pertains to a method for printing and decorating packaging materials, such as paper, paper board, metals, and various flexible and rigid polymer films by electron beam exposure of plural layers of curable inks, which do not substantially change viscosity during the printing process. The inks are essentially free of volatile components such as organic solvents, inorganic solvents, water and low molecular weight fractions before, during and after exposure to electron beam irradiation.

2. Description of the Related Art

Multicolor printing and decorating processes used in manufacturing packaging materials typically require the sequential printing of single-color ink layers. When high-quality image reproduction is desired, it is important to avoid the mixing of a previously applied ink layer with a subsequently applied ink layer. Such layer mixing typically leads to visual defects of printed image. The art of printing has addressed this problem in a number of different ways. The usual way to prevent undesirable color mixing is to dry or cure each applied ink layer prior to the application of a next ink layer. This method, while effective, suffers from a major disadvantage in that it requires a complete drying after the application of each consecutive ink layer. Drying takes time and energy to accomplish. As a result, productivity is reduced and production costs increase. An alternative to drying can be found in flexographic printing with ultra-violet (UV) curable inks. UV inks are free from violate diluents and each ink layer is cured individually prior to applying consecutive ink layers. During this process, each ink layer undergoes a significant viscosity change from a relatively low 500-2000 cps to that of an indefinitely high (solid polymer). This process allows for a stable, high quality printing but requires the introduction low molecular weight acrylated monomers and low molecular weight volatile photoinitiators. Such technology is not well suited for the low odor and migration requirements of food and/or pharmaceutical packaging. U.S. Pat. No. 6,772,683 introduces a process of wet trapping of sequential layers where energy curable flexographic inks contain 5% to 50% of volatile diluents such as water. Loss of water through evaporation leads to the development of viscosity and tack gradients between earlier applied and following ink layers. Even a small loss of water, e.g. a 5% loss of water can cause a 10-fold increase in viscosity during the printing process. A major disadvantage of this process is that the continuous loss of water during the printing process also leads to rheological instability of the printing ink during the entire printing cycle that can be as long as 6-8 hours or longer. These rheological changes (higher viscosity, loss of flow) create problems such as ink starvation, leakage and misting. Delivering this ink to the printing surface requires a very sophisticated and expensive apparatus with multiple pumps and viscosity controls.

In lithographic offset printing, inks are initially formulated free from volatile diluents, but due to mixing with fountain solutions, are required to maintain a hydrophilicity of the non-image area on the lithographic printing plate. As a result, lithographic inks always contain between 5% and 15% of water (fountain solution) that uncontrollably changes ink viscosity depending on the state of the emulsion formed between the ink and the fountain solution. These viscosity variations make lithographic offset printing of multicolor images quite challenging and difficult to control. There is clearly a need for a simple printing and decorating method which would allow applying sequential ink layers that would not substantially change viscosity during the multicolor printing process and not require complicated and costly individual curing or drying units. Such inks should meet all major requirements of the packaging applications, including low odor and migration necessary for food pharmaceutical or other items which are sensitive to migratable residuals from its packaging.

There is a great need for new methods of printing and decorating packaging materials that have a very high visual image quality, yet meeting high fitness for use standards in respect to product resistance and compliance with the U.S. Food and Drug Administration (FDA), and other regulatory agencies worldwide whose requirements have been established to protect foods from alteration. The art of packaging printing and decoration is dominated by liquid ink processes that are based on drying or curing individual ink layers through evaporation of water or volatile organic compounds. These processes consume high amount of energy and often negatively affect the environment due to emission of solvent of greenhouse gases in atmosphere. Many attempts to introduce energy curable solutions, such as Ultraviolet (UV) and electron beam (EB) flexography or UV and EB litho-offset printing processes help to reduce emissions, but either complicate printing processes or generate unacceptable for food and pharmaceutical packaging low molecular weight compounds such as photoinitiators and their by-products that can alter food or other contents through migration. It is possible, as this invention suggests, to print and decorate packaging materials with EB curable printing inks that essentially do not change in viscosity during the entire printing process, making the process very robust and easy to control, and essentially free from any low-molecular weight compounds that can alter odor, off-taste food or migrate from the cured film. Therefore, according to this invention, a multi-color printing process can be accomplished by the application of sequential layers of electron beam curable inks that have viscosity of about 5000 cps or higher, that do not substantially change during the printing process. These inks are essentially free from volatile low molecular weight organic compounds before, during and after exposure to electron beam irradiation. After curing, these inks essentially do not contain migratable species at a level that exceeds 50 parts per billion (ppb) as required by the U.S. Food and Drug Administration (FDA) for food packaging materials. Electron beam curable inks of the invention are a mixture of a colorant and an ethylenically unsaturated component. The process of invention can be used for printing and decoration of various packaging materials.

SUMMARY OF THE INVENTION

The invention provides a method of printing which comprises:
a) applying a layer of a first fluid ink onto a surface of a substrate, which first fluid ink comprises an admixture of at least one colorant, and at least one ethylenically unsaturated monomer, ethylenically unsaturated oligomer or ethylenically unsaturated polymer, which first fluid ink has a maximum of 10% volatile components; thereafter
b) applying a layer of a second fluid ink onto the layer of the first fluid ink, which second fluid ink comprises an admixture of at least one colorant, and at least one ethylenically unsaturated monomer, ethylenically unsaturated oligomer or ethylenically unsaturated polymer, which second fluid ink has a maximum of 10% volatile components; thereafter c) optionally sequentially applying one or more additional layers of additional fluid ink onto at least one prior layer, which additional fluid ink comprises an admixture of at least one colorant, and at least one ethylenically unsaturated monomer, ethylenically unsaturated oligomer or ethylenically unsaturated polymer, which additional fluid ink has a maximum of 10% volatile components; thereafter d) optionally applying a layer of a coating composition onto at least one prior layer, which coating composition comprises at least one ethylenically unsaturated monomer, ethylenically unsaturated oligomer or ethylenically unsaturated polymer, which coating composition has a maximum of 10% volatile components; and thereafter e) simultaneously exposing said layers with sufficient electron beam radiation to cause the ethylenically unsaturated monomer, ethylenically unsaturated oligomer or ethylenically unsaturated polymer in said layers to polymerize or crosslink such that they become dried.

DETAILED DESCRIPTION OF THE INVENTION

Electron beam curable ink compositions are well known in the art. In general these comprise a colorant and an ethylenically unsaturated compound, which has one or more double bonds, preferably two or more double bonds.

Useful ethylenically unsaturated compounds non-exclusively include an ethylenically unsaturated monomer, ethylenically unsaturated oligomer or ethylenically unsaturated polymer. Preferred ethylenically unsaturated compounds non-exclusively include an acrylate, a methacrylate, an epoxy, a rosin ester, a hydrocarbon resin, a vinyl compound, a polyvinyl pyrrolidone compound, a polyvinyl pyrrolidone containing copolymer, a styrene maleic anhydride compound, a urethane compound, or combinations thereof. These include epoxy acrylates, polyether acrylates, polyurethane acrylates, polyester acrylates, ethoxylated or propoxylated di- or multi-functional acrylates. Among the materials which may be used are polyfunctional terminally unsaturated organic compounds including the polyesters of ethylenically unsaturated acids such as acrylic acid and methacrylic acid and a polyhydric alcohol. Examples of some of these polyfunctional compounds are the polyacrylates and polymethacrylates of trimethylolpropane, pentaerythritol, dipentaerythritol, ethylene glycol, triethylene glycol, propylene glycol, glycerin, sorbitol, neopentylglycol, 1,6-hexanediol and hydroxy-terminated polyesters, hydroxy-terminated epoxy resins, and hydroxy-terminated polyurethanes. Also included in this group of terminally unsaturated organic compounds are polyallyl and polyvinyl compounds such as diallyl phthalate and tetraallyloxyethane and divinyl adipate, butane divinyl ether and divinylbenzene. These may be further exemplified as acrylates of primary or polyhydric alcohol or oligoacrylates such as methyl acrylate, ethyl acrylate, propyl acrylate, butyl acrylate, hydroxyethyl acrylate, 2-ethylhexyl acrylate, ethylene glycol diacrylate, trimethylolpropane triacrylate, pentaerythritol triacrylate, epoxy acrylates, oligoester acrylates, urethane acrylates or the like. They may further be exemplified as methacrylates of primary or polyhydric alcohol such as methyl methacrylate, ethyl methacrylate, propyl methacrylate, butyl methacrylate, hydroxyethyl methacrylate, 2-ethylhexyl methacrylate, diethylene glycol dimethacrylate, trimethylolpropane trimethacrylate or the like, or allyl alcohol, diallyl ether, diallyl adipate, diallyl phthalate, both end diallylates of low molecular weight polyurethane or the like.

In one embodiment, the ethylenically unsaturated compound may be present in an ink composition in an amount of from about 55 to about 95 weight percent based on the weigh of the overall ink composition. In another embodiment, the ethylenically unsaturated compound may be present in an ink composition in an amount of from about 40 to about 80 weight percent based on the weight of the overall ink composition.

The ink composition then comprises at least one colorant which can be a pigment or a dye, although pigments are preferred. Pigments can be an organic pigment, an inorganic pigment, a metallic pigment, an electrically conductive pigment, a magnetically active pigment, a nanopigment, a dielectric pigment, or combinations thereof.

As the dye or pigment colorant, any suitable dye or pigment may be used without limitation so long as the colorant is dispersible with the ethylenically unsaturated compound. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP111-S (Paul Uhlich); Brilliant Green Toner GR 0991 (Paul Uhlich); Lithol Scarlet D3700 (BASF); Solvent Red 49; Pigment red 57:1; Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Solvent Blue 808; Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA or Irgalite Blue NGA (Ciba-Geigy); Paliogen Blue 6470 (BASF); Sudan TI (Red Orange) (Matheson, Colemen Bell); Sudan TI (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Solvent Yellow 162; Paliogen Yellow 152, 1560 (BASF); Lithol Fast Yellow 0991 K (BASF); Paliotol Yellow 1840 (BASF); Novopern Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hansa bril yellow SGX 03(B); Hostaperm Pink E; Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like. Examples of suitable dyes also include Pontomine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Uquid Special 110, available from Sandoz, Inc.; D&C Yellow #10 (Acid Yellow 3), available from Tricon; Yellow Shade 16948, available from Tricon; Basocid Black.times.34, available from BASF; Carta Black 2GT, available from Sandoz, Inc.; Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrozol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) or combinations thereof. For this invention the term pigment includes a conductive powder such as a metal powder of iron, silver, copper aluminum or their alloys, a metal oxide powder, a metal carbide powder, a metal boride powder, carbon black, graphite or combinations thereof.

Useable dyes include the azo dyes which predominate the yellow, orange, brown and red hues. The violet dyes may come from any of the azo, anthraquinone, xanthene or triarylmethanes group containing compounds. Blue and green dyes are predominantly of the anthraquinone and triarylmethanes groups although it is also possible to use dyes selected from the azine, thiazine and phthalocyanine groups. Black hued dyes include azine dyes although other azo dyes can be used.

In one embodiment, the colorant may be present in an ink composition in an amount of from about 5 to about 45 weight percent based on the weight of the overall ink composition. In another embodiment, the colorant may be present in an ink composition in an amount of from about 15 to about 20 weight percent based on the weight of the overall ink composition.

The ink composition may optionally comprise one or more additional components of a wax, talc, a surfactant, a rheology modifier, a silica, a silicone, a disbursing aide, or combinations thereof. In one embodiment, the additional components may be present in an ink composition in an amount of from 0 to about 15 weight percent based on the weight of the overall ink composition. In another embodiment, the additional components may be present in an ink composition in an amount of from about 5 to about 10 weight percent based on the weight of the overall ink composition. These optional components may contain an insignificant amount of a solvent, but preferably have zero solvent.

The EB curable inks preferably have a pasty consistence with a viscosity of about 5000 cps or more, preferably from about 10,000 cps and 30,000 cps at $100 \text{ s}^{-1}$ at 25° C. The ink composition is essentially free from water or any volatile organic compounds such as organic solvents, inorganic solvents, amines and photoinitiators. The presence of these unwanted components would cause high layer surface tension, entrapment of air, inconsistency during printing, layer foaming, inability to control viscosity of the layer, as well as evaporation loss. The presence of these volatile component would require constant temperature control and viscosity monitoring. These volatiles also do not allow consistent application to the surface of a substrate at high speeds. Fluidity of the inks and coating are from the ethylenically unsaturated component only, rather than from any added solvent. While up to a maximum of 10% volatile components may be tolerated, it preferably has less than 1% volatile components, and more preferably has 0% volatile components. In order to meet regulatory requirements, the ink should have about 50 parts per billion or less of volatile components. Electron beam curable inks per se are known in the art and are generally commercially available, such as, for example Sunbeam™ brand electron beam curable inks from Sun Chemical Company of Parsippany, N.J., and Inno-Lith EB electron beam curable inks from IdeOn LLC of Hillsborough, N.J.

The inks can be imagewise applied sequentially to form a multi-color image on a substrate using a printing plate that has printing elements raised over a non-image area, such as a photopolymer based letterpress or flexographic plate or laser engraved synthetic rubber compound based plate. Individual ink layers are transferred from the top of the image element of the printing plate onto the surface of a substrate to be printed such as paper, paperboard, metal or polymeric materials such as polyethylene, polypropylene, polyester, polyamide, polyvinyl chloride, or combinations thereof. Each sequentially applied ink layer independently has a thickness of from about 1 μm to about 3 μm. Each ink layer is applied in its uncured form to the substrate or a prior ink layer. A minimum of two inks layers are applied to a substrate and usually from 1 to about 10 additional layers are applied onto a substrate via a prior ink layer.

Optionally, but preferably, a top layer of a coating composition is applied onto the prior ink layers. The coating composition comprises at least one ethylenically unsaturated monomer, ethylenically unsaturated oligomer or ethylenically unsaturated polymer, which coating composition has a maximum of 10% volatile components, which layer is composed of the above mentioned ink components, except for the colorant. Useful top layer coating compositions include InnoCoat EB coatings from IdeOn, LLC of Hillsborough, N.J. The purpose of such a topcoat could be aesthetics, e.g., matte or gloss finish, or provide functionality, e.g., barrier to moisture or gas, or control surface lubricity of the finished package.

The series of ink layers and optional coating composition layer are then subjected to an electron beam irradiation step which exposes all of the layers simultaneously and radically polymerizes or crosslinks the double bonds of the ethylenically unsaturated components to dryness. An important feature of the invention is that there is no intermediate curing of each layer prior to application of the next layer. The tackiness of two consecutive layers do not differ more then 20% of each other and in many cases can be equal. The ink and coating layers maintain a maximum 10% increase in viscosity prior to electron beam radiation, and preferably maintain a substantially constant viscosity prior to electron beam radiation. Since essentially no water or volatile organic compound is present in the ink or coating layers, their viscosities remains essentially constant during entire printing cycle as long as temperature of the environment remains the same. This makes the printing process very stable and the image quality very high. Electron beam curing of the ink and coating layers results in highly crosslinked polymer film that is essentially free from any low molecular weight compounds that can migrate into food or other migratory sensitive items.

The electron beam curable ink and coating layers are cured using a suitable electron beam source. Suitable electron beam sources may be obtained commercially from Energy Science, Inc. of Wilmington, Mass.; Advanced Electron Beams Inc. of Wilmington, Mass., or from PCT Engineering System LLC, Davenport, Iowa. The amount of energy absorbed, also known as the dose, is measured in units of MegaRads (MR or Mrad) or kiloGrays (kGy), where one Mrad is 10 kGy, one kGy being equal to 1,000 Joules per kilogram. The electron beam dose should be within the range of from about 10 kGy to about 40 kGy for essentially complete curing. When exposed to an electron beam, the ethylenically unsaturated component polymerizes or crosslinks. The precursor molecules are excited directly by the ionizing electron beam. Therefore no initiator compounds are required, so no residual volatile organic compounds are present in the finished product. Moreover, curing is substantially instantaneous and provides a cure percentage at or near one hundred percent.

The following non-limiting examples serve to illustrate the invention.

Example 1

Four inks are produced according to the following formulations. All inks have a viscosity higher then 5000 cps.
Pigment—13-18 weight % (Yellow—Pigment Y 12, Magenta—Pigment Red 48:1, Cyan—Pigment 54:4, all manufactured by Sun Chemical Co.; and Black—Pigment Black 7 manufactured by Degussa).
Joncryl 611-15 weight % (an acrylic resin manufactured by SC Johnson)
Ebecryl 40-15-20 weight % (a multifunctional acrylate compound manufactured by Cytec).
Ebecryl 450-35 weight % (a polyester acrylate, manufactured by Cytec).
DiTMPTA—10 weight % (Di-trimethylolpropane tetraacrylate from Cytec). Polyethylene wax—2 weight % (manufactured by Shamrock Technologies).
The tack of individual colors is adjusted with 3-5 of TMPTA (trimethylolpropane triacrylate) from Cytec, so the tack of sequential ink layers is within 20% of each other. All four colors are applied via a photopolymer letterpress printing plate having raised printing elements, onto a polyethylene film with a printing press manufactured by Ko-Pack. The color sequence of printing process is—yellow, magenta, cyan and black. A complete printed image is produced without intermediate curing of individual ink layers.

Example 2

A printed image generated in Example 1 is exposed to electron beam irradiation generated in an electron beam curing unit manufactured by Advanced Electron Beams Inc. at 30 Mrads dose, 125 kV penetration voltage and less then 200 ppm of oxygen. The cured ink layers have a very high chemical resistance (more than 20 methylethylketone rubs), good tape adhesion to a polyethylene film (100% with Scotch 600 and 610 tapes) and very low odor.

Example 3

A printed and cured material is tested for possible migration according to FDA Protocol. An image is placed in contact with 10:90 ethanol/water food simulating liquid in a cell designed to keep surface to food ratio in proportion to 1 sq. inch of print to 10 g of food. The printed material is kept in contact with the food simulating liquid for 10 days at 40° C. Thereafter the food simulating liquid is tested for potential migration using appropriate analytical techniques. Migration from the food contact side does not exceed 50 ppb.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method of printing which comprises:
    a) applying a layer of a first fluid ink onto a surface of a substrate, which first fluid ink comprises an admixture of at least one colorant, and at least one ethylenically unsaturated monomer, ethylenically unsaturated oligomer or ethylenically unsaturated polymer, which first fluid ink has a maximum of 10% volatile components; thereafter
    b) applying a layer of a second fluid ink onto the layer of the first fluid ink, which second fluid ink comprises an admixture of at least one colorant, and at least one ethylenically unsaturated monomer, ethylenically unsaturated oligomer or ethylenically unsaturated polymer, which second fluid ink has a maximum of 10% volatile components; thereafter
    c) optionally sequentially applying one or more additional layers of additional fluid ink onto at least one prior layer, which additional fluid ink comprises an admixture of at least one colorant, and at least one ethylenically unsaturated monomer, ethylenically unsaturated oligomer or ethylenically unsaturated polymer, which additional fluid ink has a maximum of 10% volatile components; thereafter
    d) optionally applying a layer of a coating composition onto at least one prior layer, which coating composition comprises at least one ethylenically unsaturated monomer, ethylenically unsaturated oligomer or ethylenically unsaturated polymer, which coating composition has a maximum of 10% volatile components; and thereafter
    e) simultaneously exposing said layers with sufficient electron beam radiation to cause the ethylenically unsaturated monomer, ethylenically unsaturated oligomer or ethylenically unsaturated polymer in said layers to polymerize or crosslink such that they become dried;
    wherein the first fluid ink, the second fluid ink, each additional fluid ink, if present, and the coating composition, if present, have a viscosity of from about 5,000 cps or more; and
    wherein the first fluid ink, the second fluid ink, each additional fluid ink, if present, and the coating composition, if present, maintain a maximum 10% increase in viscosity prior to electron beam radiation.

2. The method of claim 1 wherein step c) is conducted by applying from 1 to about 10 additional layers onto at least one prior layer.

3. The method of claim 1, wherein step d) is conducted.

4. The method of claim 1 wherein the first fluid ink, the second fluid ink, each additional fluid ink, if present, and the coating composition, if present, have less than 1% volatile components.

5. The method of claim 1 wherein the first fluid ink, the second fluid ink, each additional fluid ink, if present, and the coating composition, if present, have about 50 parts per billion or less of volatile components.

6. The method of claim 1 wherein the first fluid ink, the second fluid ink, each additional fluid ink, if present, and the coating composition, if present, have about 0% volatile components.

7. The method of claim 1 wherein the first fluid ink, the second fluid ink, each additional fluid ink, if present, and the coating composition, if present, are substantially absent of water, organic solvents, inorganic solvents, amines and photoinitiators.

8. The method of claim 1 wherein the first fluid ink, the second fluid ink, each additional fluid ink, if present, and the coating composition, if present, maintain a substantially constant viscosity prior to electron beam radiation.

9. The method of claim 1 wherein the first fluid ink, the second fluid ink, each additional fluid ink, if present, and the coating composition, if present, independently comprise an least one ethylenically unsaturated monomer, ethylenically unsaturated oligomer or ethylenically unsaturated polymer which is an acrylate, a methacrylate, an epoxy, a rosin ester, a hydrocarbon resin, a vinyl compound, a polyvinyl pyrrolidone compound, a polyvinyl pyrrolidone containing copolymer, a styrene maleic anhydride compound, a urethane compound, or combinations thereof.

10. The method of claim 1 wherein the first fluid ink, the second fluid ink, each additional fluid ink, if present, and the coating composition, if present, independently comprise an least one ethylenically unsaturated monomer, ethylenically unsaturated oligomer or ethylenically unsaturated polymer which is an acrylate or methacrylate.

11. The method of claim 1 wherein the first fluid ink, the second fluid ink, and each additional fluid ink, if present, independently comprise a colorant which is an organic pigment, an inorganic pigment, a metallic pigment, an electrically conductive pigment, a magnetically active pigment, a nanopigment, a dielectric pigment, or combinations thereof.

12. The method of claim 1 wherein the first fluid ink, the second fluid ink, and the additional fluid ink, independently comprise one or more additional components of a wax, talc, a surfactant, a rheology modifier, a silica, a silicone, a disbursing aide, or combinations thereof.

13. The method of claim 1 wherein the first fluid ink, the second fluid ink, each additional fluid ink, if present, are imagewise applied to the substrate from a raised image printing plate.

14. The method of claim 1 wherein the electron beam radiation exposure is at a dose of from about 10 kGy to about 40 kGy.

15. The method of claim 1 wherein the first fluid ink, the second fluid ink, each additional fluid ink, if present, independently comprise from about 5 to about 45 weight percent of colorant.

16. The method of claim 1 wherein the first fluid ink, the second fluid ink, each additional fluid ink, if present, independently comprise from about 55 to about 95 weight percent of at least one ethylenically unsaturated monomer, ethylenically unsaturated oligomer or ethylenically unsaturated polymer.

17. The method of claim 1 wherein the layer of the first fluid ink, the layer of the second fluid ink, the additional layers of additional fluid ink, if present, and the layer of coating composition, if present, each independently have a thickness of from about 1 µm to about 3 µm.

18. The method of claim 1 wherein the substrate comprises paper, paper board, metal, polyethylene, polypropylene, polyester, polyamide, polyvinyl chloride, or combinations thereof.

19. The method of claim 1 wherein the tackiness of two consecutive of the applied layers does not differ by more than 20%.

* * * * *